(12) United States Patent
Sosa Hernandez et al.

(10) Patent No.: US 11,962,044 B2
(45) Date of Patent: Apr. 16, 2024

(54) ROTATING CYLINDER ELECTROCHEMICAL CELL

(71) Applicant: INSTITUTO MEXICANO DEL PETROLEO, Mexico City (MX)

(72) Inventors: Eliceo Sosa Hernandez, Mexico City (MX); Marco Antonio Dominguez Aguilar, Mexico City (MX); Hongbo Liu, Mexico City (MX); Jorge Luis Alamilla Lopez, Mexico City (MX); Jorge Flores Castillo, Mexico City (MX); Marco Antonio Hernandez Rojo, Mexico City (MX); Ivan Velazquez Ovando, Mexico City (MX); Cesar Mendez Romero, Mexico City (MX); Luis Manuel Quej Ake, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 91 days.

(21) Appl. No.: 17/107,100

(22) Filed: Nov. 30, 2020

(65) Prior Publication Data

US 2021/0167350 A1 Jun. 3, 2021

(30) Foreign Application Priority Data

Nov. 28, 2019 (MX) .................... MX/a/2019/014233

(51) Int. Cl.
| | |
|---|---|
| *H01M 50/571* | (2021.01) |
| *G01N 17/02* | (2006.01) |
| *H01M 50/30* | (2021.01) |
| *H01M 50/578* | (2021.01) |

(52) U.S. Cl.
CPC .......... *H01M 50/578* (2021.01); *G01N 17/02* (2013.01); *H01M 50/30* (2021.01); *H01M 50/571* (2021.01)

(58) Field of Classification Search
CPC .......................... H01M 50/571; H01M 50/578
See application file for complete search history.

(56) References Cited

PUBLICATIONS

S. Papavinasam et al., Laboratory Methodologies for Corrosion Inhibitor Selection, 39 Materials Performance 58-60 (2000).*
S. Papavinasam et al., Comparison of Laboratory Methodologies to Evaluate Corrosion Inhibitors for Oil and Gas Pipelines, 59 Corrosion 897-912 (2003).*
F. F. Rivera and J. L. Nava, Mass Transport Studies at Rotating Cylinder Electrode (RCE) Influence of Using Plates and Concentric Cylinder as Counter Electrodes, 52 Electrochim. Acta 5868-5872 (2007).*
F. F. Rivera et al., Mass Transport Studies at Rotating Cylinder Electrode: Influence of the Inter-Electrode Gap, 55 Electrochim. ACTA 3275-3278 (2010).*
"Laboratory Test Methods for Evaluating Oilfield Corrosion Inhibitors", NACE International Publication 1D196, Dec. 1996, pp. 1-13, Item No. 24192.
"Wheel Test Method Used for Evaluation of Film-Persistent Corrosion Inhibitors for Oilfield Applications", NACE International Publication 1D182, Apr. 2005, pp. 1-4, Item No. 24007.
"Evaluation of Pipeline and Pressure Vessel Steels for Resistance to Hydrogen-Induced Cracking", NACE International, Jan. 1, 2003, 15 pages, NACE Standard TM0284-2003, Item No. 21215.
ASTM Designation: G 170-01, "Standard Guide for Evaluating and Qualifying Oilfield and Refinery Corrosion Inhibitors in the Laboratory1", National Assoc. of Corrosion Engineers & American National Standards Institute, Sep. 2001, pp. 1-17.
ASTM Designation: G184-06 (Reapproved 2016), "Standard Practice for Evaluating and Qualifying Oil Field and Refinery Corrosion Inhibitors Using Rotating Cage1", ASTM International, Nov. 1, 2016, pp. 1-6.
ASTM Designation: G185-06, "Standard Practice for Evaluating and Qualifying Oil Field and Refinery Corrosion Inhibitors Using the Rotating Cylinder Electrode1", ASTM International, Feb. 2006, pp. 1-8.
Leon et al., "Corrosion of Carbon Steel in a Typical Solution TM 0177 Is Born and 1D 196 is Born in the Presence of Hydrocarbon", 2010, pp. 352-361 (Google Translation).
Tebbal et al., "Assessment of Crude Oil Corrosivity", Corrosion 98, 1998 NACE International, Paper No. 578, pp. 1-10.
Menendez, "Reference Electrodes for High Pressure and High Temperature Electrochemical Testing", Corrosion 2001, 2001 NACE International, Paper No. 01305, 15 pages.
Papavinasam et al., "Synergistic Effect of Pressure and Flow On Corrosion Rates: Studies Using High-Temperature, High-Pressure Rotating Electrode System", Corrosion 99, NACE International, Paper No. 30, 13 pages (1999).

(Continued)

*Primary Examiner* — Randy Boyer
(74) *Attorney, Agent, or Firm* — FisherBroyles, LLP; Jason P. Mueller (57) ABSTRACT

The present invention offers some general specifications for the design, assembly, and adaptation of a rotating cylinder electrochemical cell into an autoclave, of a high temperature and pressure system for corrosion studies that simulate operating conditions in pipelines, as well as the operation and safety of an autoclave to evaluate the electrochemical process of metal surfaces exposed to aggressive aqueous solutions. The electrochemical cell consists of an array of three electrodes that include a rotating cylinder electrode designed to operate hermetically, a reference electrode and an auxiliary electrode. The rotating cylinder electrode is considered to be the working electrode, where the oxidation and electrochemical reduction processes are studied. However, the use of the method described in this work can be extended to other testing environments and materials by taking into account the physical and chemical properties of the fluids and materials to be used in order to avoid any risk for the operator.

15 Claims, 5 Drawing Sheets

(56) References Cited

PUBLICATIONS

"Laboratory Testing of Metals for Resistance to Sulfide Stress Cracking and Stress Corrosion Cracking in H2S Environments", NACE International, Revised Dec. 3, 2005, 43 pages, NACE Standard TM0177-2005, Item No. 21212.

Hall et al., "Review of pH and Reference Electrodes for Monitoring Corrosion in HPHT Extreme Environments", NACE International, 2015, pp. 1-15, Paper No. 6117.

Oliveira et al., "Viscosity of Water-in-Oil Emulsions from Different American Petroleum Institute Gravity Brazilian Crude Oils", Energy Fuels, 2018, pp. 2749-2759, vol. 32, ACS Publications, DOI: 10.1021/acs.energyfuels.7b02808.

Nesic et al., "Comparison of the Rotating Cylinder and Pipe Flow Tests for Flow-Sensitive Carbon Dioxide Corrosion", Corrosion Science, NACE International, 1995, pp. 773-787, Corrosion—vol. 51, No. 10.

\* cited by examiner

ROTATING CYLINDER ELECTROCHEMICAL CELL

RELATED APPLICATIONS

This application claims priority under 35 U.S.C. § 119 based on Mexican Application No. MX/a/2019/014233, filed on Nov. 28, 2019, the disclosure of which is incorporated by reference.

FIELD OF INVENTION

The present invention is related to a rotating cylinder electrochemical cell that includes a reference electrode, a working electrode and an auxiliary electrode provided with high surface area to improve the current distribution and electrical potential. This cell can operate in a controlled manner at high pressure and high temperature, allowing performing electrochemical studies of metallic materials under conditions that simulate hydrodynamic conditions, in agreement with the current standardized methodology.

BACKGROUND OF INVENTION

In industry, metals are used for the design and construction of transmission facilities for the extraction and processing industries. Thus, the surfaces of metals in contact with the flow of fluids under temperature and pressure conditions are significantly affected by corrosion. In the oil and gas industry, production, transmission and logistics operations involve turbulent hydrodynamic conditions, different concentrations of pollutants, and a variety of physicochemical properties of crude oils, which make the corrosion problem more complex. Corrosion problems are still an issue of great academic and industrial interest because they are related to electrochemical processes in aggressive electrolytes and at such pressures and temperatures. This has led to the design and construction of devices capable of obtaining relevant parameters that describe the electrochemical process of materials' corrosion and protection.

Figure 1:
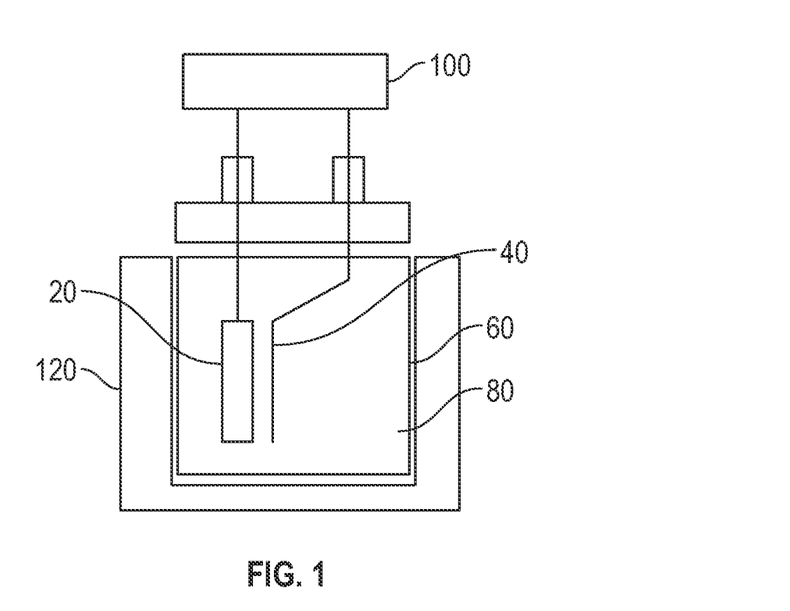
FIG. 1 shows a system of a cell describing the application of the American patent US20100155262A, with an array of electrodes and a scheme consisting of an autoclave to carry out electrochemical tests of O. Yepez et al.

There are publications related to the description of some electrochemical cell designs used for internal corrosion studies; however, most studies have been conducted using the gravimetric method in autoclaves [8-11]. Some electrochemical systems are coupled to autoclaves to conduct basic corrosion studies, such as the measurement of corrosion potential at high pressure and high temperature [9.12]. The electrochemical arrangement of these systems is often designed with fixed electrodes, where hydrodynamic conditions are simulated by integrating vanes or magnetic stirrer, independent of electrodes. Diverse works describing electrochemical cells have been found in the literature, although none of them involves a rotating cylinder with a hermetic seal that allows withstanding high pressures. An example of these works is an American patent with publication No. US20100155262A1 (O. Yépez, Randolph B. and X. Gong, "Apparatus and Method to Measure Electrochemical Impedance", Jun. 24, 2010), concerned with the design of a cell to study corrosion of steels exposed to crude oil by electrochemical impedance spectroscopy. The patent shows an electrochemical cell design composed of two electrodes (FIG. 1). Additionally, the system is composed of the following elements: (20) an auxiliary electrode or counter-electrode, (40) a working electrode, (60) a container or vessel, (80) a corrosive environment, (100) a potentiostat-galvanostat to obtain experimental data of EIS, and (120) a jacket. There are other patents associated with inventions for electrochemical studies of rotating electrodes (American patent US 2016/0313274, A1 Ch. McCrory, S. Jung, R. John, R. Jones, "Rotating disk electrode cell", 27 Oct. 2016); and others involving high temperatures: E. Y. Ting, N. G. Lönneborg, A. Triff, "Method for High Pressure Treatment of Substances under Controlled Temperature Conditions". American patent U.S. Pat. No. 7,220,381 B2, May 22, 2007; R. O Rihan, M. Qubbai, M. Basha, L. Al-Hadhrami, "Stress Corrosion Cracking Testing Device", American patent U.S. Pat. No. 8,474,324 B2, July 2013; J. R. Stanford, G. D. Chappell, "High Temperature Corrosion Inhibitor for Gas and Oil Wells"; American patent U.S. Pat. No. 3,959,158, May 1976; H. T. Hall, Provo, "High Temperature High Pressure Apparatus"; American patent U.S. Pat. No. 2,941,248, June 1960, E. Schasehl, C. Lake, "Corrosion Testing Probe"; American patent U.S. Pat. No. 2,864,252, December 1958; and the Chinese Patent CN 107290229 A published in October 2017.

It is worth noticing that this patent review observed a lack of information related to electrochemical cells with a rotating cylinder electrode. In order to control corrosion, it is necessary to design and implement techniques and instruments such as the rotating electrode to simulate hydrodynamic turbulence in the transmission of hydrocarbons [13, 14]. The current invention surpasses by far the previously indicated references, as it adapted a rotating cylinder electrode into an autoclave hermetically sealed to avoid any losses, and can also be operated at high pressure and high temperature. This electrochemical cell is integrated into the autoclave providing an array of three electrodes, which are smartly installed to minimize ohmic drop (resistivity) in the cell.

Known publications, some of which are referenced herein, are listed below:

[1] NACE 1D196 Laboratory Test Methods for Evaluating Oilfield Corrosion Inhibitors, National Association of Corrosion Engineers, NACE, 1996.

[2] NACE 1D182 Wheel Test Method Used for Evaluation of Film-Persistent Corrosion Inhibitors for Oilfield Applications, National Association of Corrosion Engineers, NACE, 2005.

[3] NACE TM0284 Evaluation of Pipeline and Pressure Vessel Steels for Resistance to Hydrogen-Induced Cracking, National Association of Corrosion Engineers, NACE, 2003.

[4] ASTM G170: Standard Guide for Evaluating and Qualifying Oilfield and Refinery Corrosion Inhibitors in the Laboratory, West Conshohocken, PA, ASTM Int., 2001.

[5] ASTM G184: Standard Guide for Evaluating and Qualifying Oilfield and Refinery Corrosion Inhibitors Using Rotating Cage, West Conshohocken, PA, ASTM Int., 2006.

[6] ASTM G185: Standard Guide for Evaluating and Qualifying Oilfield and Refinery Corrosion Inhibitors Using Rotating Cylinder Electrode, West Conshohocken, PA, ASTM Int., 2006.

[7] L. D. López León, M. A. Veloz Rodriguez, V. E. Reyes Cruz, S. A. Pérez Garcia, "Corrosion de acero al carbono en una solución tipo NACE TM 0177 y NACE 1D196 en presencia de hidrocarburo, XXV Congreso de la Sociedad *Mexicana* de Electroquímica, Zacatecas, México, 2010.

[8] S. Tebbal and R. D. Kane, Assessment of Crude Oil Corrosivity, Corrosion 98, Paper No. 578.

[9] C. M. Menendez, Reference Electrodes for High Pressure and High Temperature electrochemical testing, Corrosion 2001, Paper No. 01305.

[10] S. Papavinasam, Synergistic Effect of Pressure and Flow on Corrosion Rates: Studies using High-Temperature, High-Pressure Rotating Electrode System, Corrosion 99, Paper No. 30.

[11] NACE TM 0177, Laboratory Testing of Metals for resistance to specific forms of environmental cracking in $H_2S$, National Association of Corrosion Engineers, NACE, 1996.

[12] D. Hall, J. Beck, and S. Lvov, M. Ziomek-Moroz, Review of pH and references electrodes for monitoring corrosion in HPHT extreme environments", Corrosion 2015, paper No. 6117.

[13] Marcia Cristina K. de Oliveira, Luise R. O. Miranda, Alexandre B. M. de Carvalho, and Daniele Fraga S. Miranda Viscosity of Water-in-Oil Emulsions from Different American Petroleum Institute Gravity Brazilian Crude Oils, Energy Fuels 32 (2018), 2749-2759.

[14] S. Nešić, G. T. Solvi, and J. Enerhaug, "Comparison of the Rotating Cylinder and Pipe Flow Tests for Flow-Sensitive Carbon Dioxide Corrosion", Corrosion Vol. 51 No. 10 (1995).

SUMMARY OF THE INVENTION

This document describes the design and construction of a rotating cylinder cell for electrochemical studies, which simulates hydrodynamic conditions combined with temperature and pressure. In order to contribute to the understanding of the corrosion phenomenon, some representative environments, recommended by different international standards, have been reported to simulate the electrolytes present in real environments of the oil industry for internal corrosion studies [1-6]. For example, the corrosive medium recommended by NACE TM 0177 contains the following electrolytes: 0.04M $CH_3COOH/NaCOOCH_3$, pH=3.5; 30, 172 ppm of $Cl^-$ as sodium chloride (NaCl: 0.52 M $Cl^-$), in the absence and presence of hydrocarbon (20% volume); while the solution recommended by NACE 1D196 contains the following inorganic salts: 0.8954 g of di-hydrated calcium chloride $(CaCl_2)(2H_2O)$), 0.4122 g of hexa-hydrated magnesium chloride $(MgCl_2(6H_2O)$, and 21, 3157 g of NaCl to prepare a volume of 200 ml of brine in the absence and presence of hydrocarbon in a ratio of 8:2 [7].

The present invention offers some general specifications for the design, assembly, and adaptation of a rotating cylinder electrochemical cell into an autoclave, of a high temperature and pressure system for corrosion studies that simulate operating conditions in pipelines, as well as the operation and safety of an autoclave to evaluate the electrochemical process of metal surfaces exposed to aggressive aqueous solutions. The electrochemical cell consists of an array of three electrodes that include a rotating cylinder electrode designed to operate hermetically, a reference electrode and an auxiliary electrode. The rotating cylinder electrode is considered to be the working electrode, where the oxidation and electrochemical reduction processes are studied. However, the use of the method described in this work can be extended to other testing environments and materials by taking into account the physical and chemical properties of the fluids and materials to be used in order to avoid any risk for the operator.

One of the objectives of the present invention is to provide an electrochemical cell (working electrode) with a reference electrode and a high surface area auxiliary electrode to improve the electric current distribution and make it operate at high pressure and high temperature. Another objective is to provide a normalized method to simulate hydrodynamic effects at high temperature and high pressure for corrosion and electrochemistry studies.

BRIEF DESCRIPTION OF THE DRAWINGS

For a better understanding of the electrochemical cell with a rotating cylinder electrode, the object of the present invention, references to the drawings of this invention are provided. Although drawings show particular dispositions of accessories and devices that are useful to be implemented in practice, this invention should not be understood as limitative to any other particular arrangement for the experimental setup.

DETAILED DESCRIPTION OF INVENTION

The present invention is related to an electrochemical cell with a rotating cylinder that includes a reference electrode, a working electrode, and an auxiliary or counter electrode provided with a high surface area to improve current distribution and electrical potential. Additionally, it can operate at high pressure and high temperature, allowing performing electrochemistry studies with the standard methodology to simulate hydrodynamic effects at high temperature and pressure.

Figure 2:
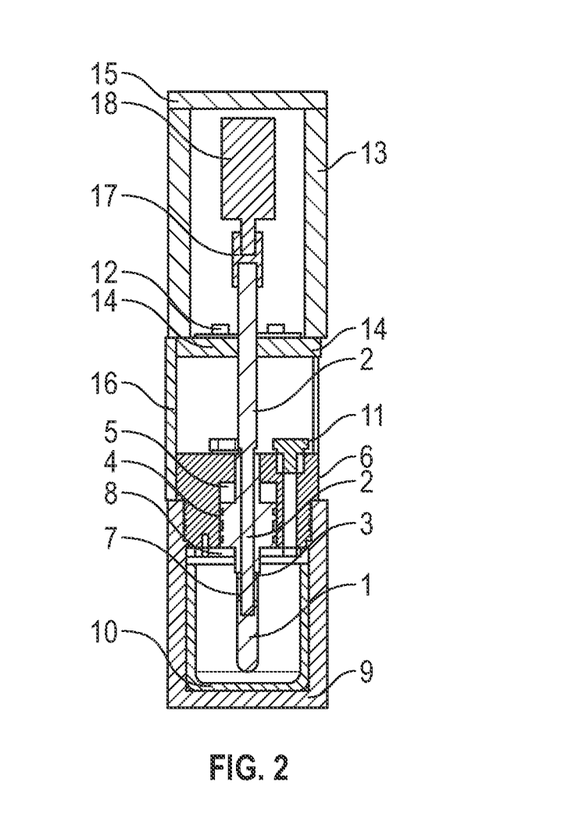
FIG. 2 shows the design of a rotating cylinder electrochemical cell provided with a conventional array of three electrodes. Likewise, the scheme shows the parts that make up the system: Electrode (1), 1 piece; Conductor (2), 1 piece; Washer (3), 2 pieces; Ax (4), 1 piece; Bearing 51201 (5), 1 piece; Nut (6), 1 piece; Lid (7), 1 piece; Gasket (8), 1 piece; Cell (9), 1 piece; Hose (10), 1 piece; Port (11), 3 pieces; Bearing brush (12), 1 piece, Case (13), 1 piece; Case lid IN (14), 1 piece; Case lid SUP (15), 1 piece; Support (16), 3 pieces; Coupling alignment by motor flange adapter (17), 1 piece, Power unit (18), 1 piece.
Figure 3:
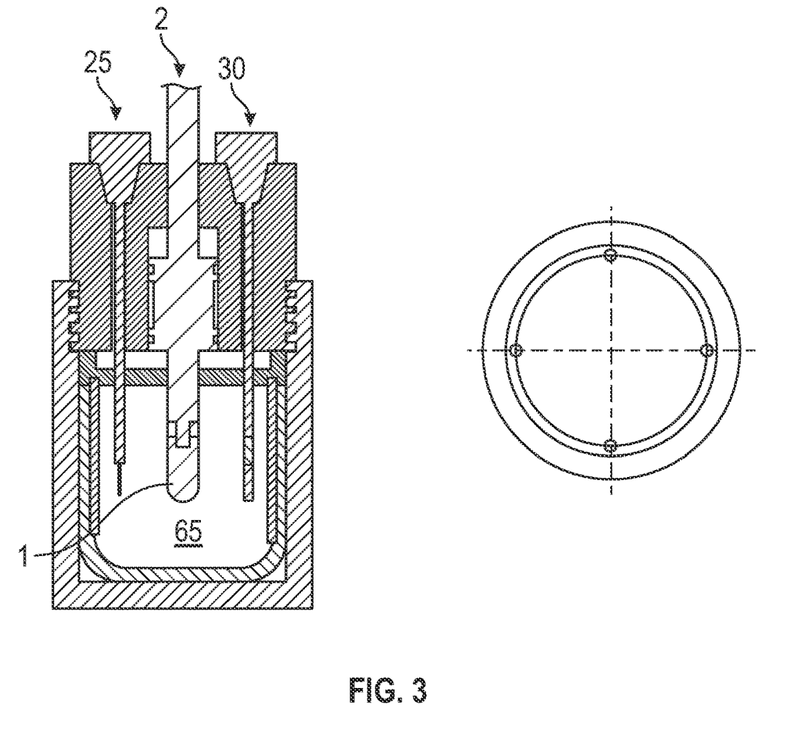
FIG. 3 shows a detailed scheme of the electrochemical cell after installing the auxiliary electrodes (30), a pseudo reference electrode (25), and the working electrode (1), operating in the electrolyte (65). Likewise, a mechanical arrangement displayed shows the rotating operation of the working electrode (1), the components providing tightness as a seal and the auxiliary electrodes (30) that are immersed in an electrolyte (65).
Figure 4:
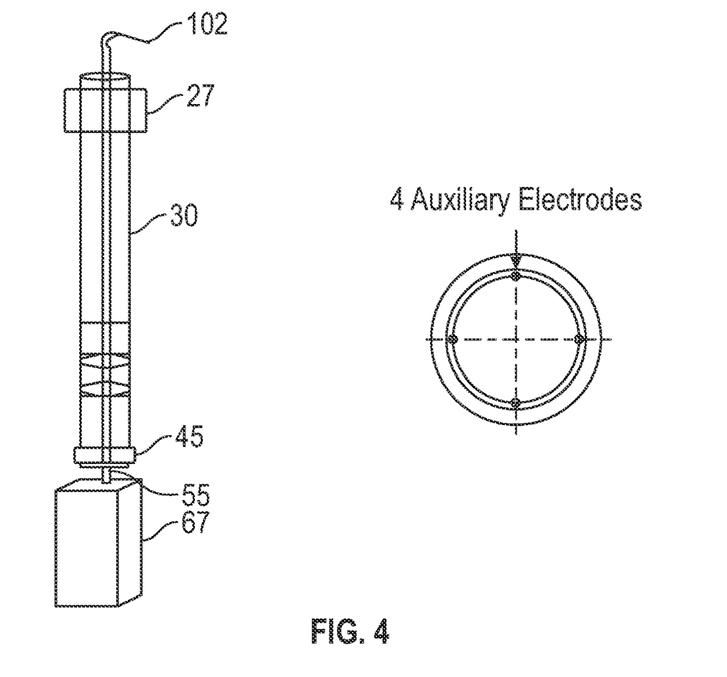
FIG. 4 shows a scheme of a pseudo auxiliary electrode (30) made of nickel 200 coupled to an electrode holder (67) and also to a device of four concentric auxiliary electrodes. It is composed of a nickel wire (102), Adjustment nut for the reactor made of stainless steel (27), Body of stainless steel (30), Insulating material made of Teflon (45), Threaded male adapter (55) to mount the pseudo auxiliary electrode made of nickel 200.

FIG. 2 shows the design of an electrochemical cell (9), the object of the present invention, with a three-electrode array that includes a rotating electrode (1) mechanically adapted to hermetically operate at pressure (up to 70 kg/cm$^2$) by installing seals for dynamic operation and a bearing system (5) with the necessary features to operate at temperatures within the range of 20-120° C. for electrochemical studies on metals under fluid flow conditions, pressure, and temperature. The criteria for the design and construction of this invention are based on the knowledge of the electrochemical processes and corrosion that occur on metallic materials exposed to monophasic and multiphasic flow under turbulent hydrodynamic conditions. The procedure for the design, construction, and adaptation of the electrochemical cell was done following these stages: Stage 1, adaptation of different electrode holders to place the rotating cylinder inside the reactor to perform studies of electrochemical oxidation and reduction (working electrode); Stage 2, adaptation of a reference electrode (pseudo-reference) to the reactor; Stage 3, adaptation of an auxiliary electrode (pseudo electrode) to the reactor, including their components and accessories. In agreement with FIG. 2, the equipment to study the electrochemical process under conditions of pressure and temperature includes an autoclave, an electrochemical cell with a rotating cylinder (8), ports to introduce electrodes (11), and the supply system of the pressure medium (i.e., nitrogen, argon, etcetera). The device, object of the present invention, was designed to be attached to the autoclave's motor (18) through a coupler (17). The rotating electrode (1) is attached to the coupler (17) via mechanical devices and appropriate seals to allow the electrode (1) to rotate in a pressurized environment. This electrode (1) presents an exposed surface of approximately 2.3 cm$^2$, corresponding to the mechanical integration of a metallic sample joined by a mechanical thread to a rod or conductor (2) aimed to determine the electrochemical conditions of the electrode. A second electrode, shown in FIGS. 3 and 5, called pseudo-reference, includes a wire of platinum of 5 cm length and 0.01 mm diameter to offer an exposed area of 1.57 cm$^2$. A third electrode, shown in FIGS. 3 and 4, is also provided with a rectangular nickel 200 bar of 5.0×2.0×0.5 cm, exhibiting an exposed area of 26 cm$^2$, which can be coupled to a device holder of 4 electrodes, concentrically distributed as shown in FIG. 4b, and placed on an electrode holder inside a cylindrical container or hose, where the electrolyte sample is contained (10). The rotating cylinder electrode electrochemical cell (9) was designed with mechanical adaptations to install different electrode holders to couple the rotating cylinder electrode (working electrode), the auxiliary electrode (FIG. 5) and the reference electrode (FIG. 4), as well as their accessories. The cell has a hermetic container (9) (6), which houses the electrode holder, electrodes, and electrolyte. It is also provided with the necessary features to reproduce the electrochemical processes of corrosion generated by hydrodynamic effects. The rotating cylinder electrode cell can retain a volume of 0.250 liters of solution (electrolyte) within a small container made of Teflon (10). This container can be manufactured in different sizes to control the volume of electrolyte to study diverse hydrodynamic conditions of flow, as there is a relationship between the diameter of the cylinder components and the shear stress generated. The electrochemical cell can be coupled to an autoclave, through a conductor (2) or a rod that is connected to the working electrode through a couple (17). The conductor or rod makes up the electrode that can rotate by providing a bearing system (5), which keeps tightness on the drive shaft through the installation of dynamic seals. This way, the conductor or rod is electrically isolated, separating the working electrode (1) with a Teflon gasket (7), and the electrical signal, product of the electrochemical reaction between the medium and the working electrode (1), is conducted by means of a brush system (12) and carried to the data recording and acquisition systems by means of low resistivity electrical cables. The autoclave operates at high pressures (5000 psi, 34.5 MPa, 345 bar, 351.5 kg/cm$^2$ as maximum pressure) and 350° C. of temperature.

The following section describes the autoclave. This vessel is the piece of equipment to which the rotating cylinder electrode electrochemical cell, the object of the present invention, was adapted:

The autoclave is constructed of T316 stainless steel with a moving head to accommodate a volume of 1.8 liters. It has a moving head or cap that contains a flat graphite or Teflon seal and ring-type closure. The autoclave is sealed by a split flange using 12 screws (distributed across the top of the lid) that hold the lid to the pressure vessel. On the other hand, its motor and the control panel are mounted on a special support. The motor, to which the electrochemical cell electrode, the subject of this document, is attached, is designed with a variable speed of ¼ horsepower (hp). In addition, it contains an internal Calrod-type heater, with a power capacity of 2800 W, using a 230V/15A power supply. The maximum design pressure of the autoclave vessel is 5000 psi (34.5 MPa, 345 bar), and the maximum operating temperature is 350° C. However, the pressure and temperature conditions shall be limited to a maximum test pressure of 70 kg/cm$^2$ and a maximum test temperature of 120° C. The autoclave has two cooling systems. The first is located inside the heating container. The second is adapted to fit near the magnetic disk (magnetic driver).

It is important to mention that the autoclave area must be well ventilated, and it is advisable to place it near an extraction hood or fan so that the gases can be vented safely. There should be no open flames in adjacent areas. If there is any possibility that the autoclave could get out of control, a protective screen should be fitted. In the event of an accident or unexpected overpressure, the rupture disc will burst to relieve internal pressure before the vessel is damaged by that pressure; consequent steps must be taken to handle noise, disturbances, and fumes released by this pressure relief. A tubing extension attached to the safety rupture disc, leading to a suitable discharge area, offers the best protection for this event. The rupture disc bursts causing a thunderous noise that can damage the hearing of anyone near the autoclave, so the use of earplugs should be considered. FIG. 2 shows the arrangement of the autoclave with the rotating cylinder electrode electrochemical cell. FIG. 3 shows the design of the rotating cylinder electrode (RCE) as a working electrode. The exposed surface, located at the tip of the rod, is approximately 2.30 cm$^2$ and is mainly made of metal. The rod or RCE has a special device to maintain the conduction of generated electrical signals, which allows an assembly with the electrical contact of the electrode holder, through a brush.

A diagram of the front and side views of the present invention's electrode arrangement is shown in FIG. 3. Additionally, it is important to mention that the change in the volume of electrolyte in the cell, where the rotating cylinder is contained, will allow expanding the Reynolds number to be simulated by means of the rotation tests in the cylinder, due to the effect it has on the angular velocity [14]. The Reynolds number is defined as Re=ρ D/A so that there is a direct relationship between the number of Re and the diameter of the system.

As the diameter of the cell increases, the Reynolds number increases, and vice versa; reducing the cross-sectional area of the electrode decreases the Reynolds number. It is also necessary to have a Re>2000 to achieve a turbulent flow. However, there are hydrodynamic conditions under which different shear stresses are generated depending on the flow velocity, according to:

$$\tau_W = 0.0791 \, \rho \omega^2 r^2 Re^{-0.3} \quad (1)$$

$$R_e = 2r^2 \omega (1/\nu) \quad (2)$$

$$\nu = \mu / \rho \quad (3)$$

where τ is the shear stress (N/m$^2$); ρ is the density of the fluid (kg/m$^3$); w is the angular velocity (rad/s); r is the radius of the cylinder (cm); μ is the dynamic viscosity (kg/ms); ν is the kinematic viscosity (m$^2$/s) and Re is the Reynolds number. As an example, the following Tables are given for an API X52 steel cylinder with a diameter of 1.18 cm, a height of 0.789 cm, and an exposed area of 2.92 cm$^2$, using a bitter brine with a density, ρ=1025 kg/m$^3$ and kinematic viscosity μ=1,046 m$^2$/s. Table 1 shows the shear stress calculation as a function of the cylinder rotation speed and Table 2, as a function of the electrode diameter. As can be seen, both the rotation speed and the rotating cylinder diameter generate considerable shear stresses on the surface of the working electrode.

FIG. 4 shows the adaptation of the electrode holder and the auxiliary electrode. The adaptation consists of an insulating system (Teflon at the interface of stainless steel and copper to ensure electrical continuity, the latter being fixed with high-temperature glue) between the electrical contact and the body of the electrode holder. Another important modification is the adaptation of a nickel wire with Teflon coating to withstand temperatures of around 250° C. to provide the electric contact between the electrodes with the potentiostat-galvanostat. Still another modification involves the manufacture of a second electrode, the so-called pseudo-reference electrode, which consists of a platinum tip 5 cm long and 0.1 mm in diameter and provides an exposed area of 1.57 cm$^2$.

Figure 5:
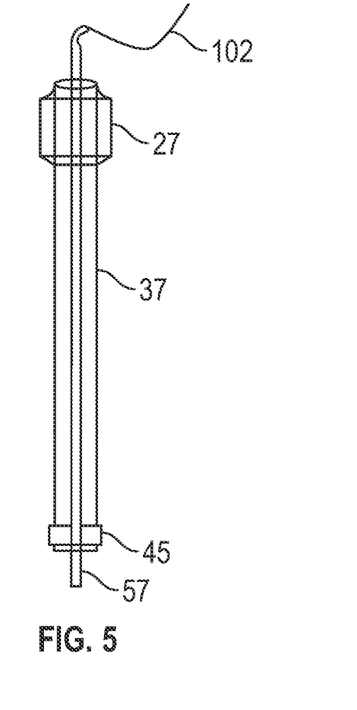
FIG. 5 shows a scheme of a pseudo-reference electrode made of platinum coupled to an electrode holder composed of the following parts: Nickel 200 wire (260° C.) (102) Adjustment nut for the reactor made of stainless steel (27), Body of stainless steel (37), Insulating material made of Teflon (45), and Reference electrode made of platinum (57).

The reference electrode holder was manufactured from a solid bar of stainless steel type 316, with the internal bore of 3/16" in diameter, in which at one end the pins were adjusted to the machined stops according to ports and at the other end the change from female to male connection with copper pin and 5/16 24 NF threaded Teflon was made. In this way, two electrode holders were built in 304 stainless steel coupled to a Teflon coating with an internal diameter of 12.7 mm and a length of 300 mm. The third electrode is an auxiliary electrode (pseudo-auxiliary electrode, FIG. 4a) and includes a rectangular nickel bar 200 with dimensions of 5.0 cm×2.0 cm×0.5 cm to provide an exposed area of 26 cm$^2$; this material can be attached to a device in the form of 4 electrodes distributed concentrically with an area of 12 cm$^2$ to increase the current distribution and potential (FIG. 4b). FIG. 5 shows the accessories that make up the platinum pseudo-reference electrode coupled to the electrode holder. In this case, the electrode holders were made of stainless steel; however, the construction of these devices can be machined from a highly resistant material, according to the corrosive medium under study. For example, nickel alloys (Hastelloy, Inconel, Incoloy, etc.) can be used for sour environments under high pressure and high temperature conditions in the presence of chlorides. Similarly, a more economical option, such as super duplex stainless steel and super austenitic steels, could be considered for moderate pressure and temperature conditions in mild environments, in the presence of chlorides.

The design and construction of three electrode holders of 304 stainless steel with external Teflon coating, an internal diameter of 12.7 mm and a length of 300 mm, were carried out. In addition, a 304 stainless steel nozzle stop set was designed and built with an inner diameter of 8 mm and 9.7 mm, and a length of 16 mm. The electrodes were made of a 304 stainless steel solid bar, whose outer diameter of 12.7 mm was reduced by machining operation to 12 mm of external diameters and 10 mm, in agreement with the port diameters of the autoclave. The internal bore was also machined to 3/16" in diameter. At one end of the electrodes, the pins were adjusted to the machined stops according to ports and at the other end, the change from female to male connection with copper and Teflon pin was made, 5/16 24 NF threaded. In addition, 3 working electrodes of 0.8 cm in diameter and 2.5 cm in length coupled with a Teflon coating were designed and built. The electrodes have an internal thread to assemble with the electrical contact of the electrode holder, which has mechanical adaptations to install an electrical insulator (Teflon at the interface of stainless steel and copper to ensure electrical continuity, the latter being fixed with high-temperature glue) between the electrical contact and the body of the electrode holder.

Characterization methodology. Until now, there is no standardized methodology to carry out corrosion tests under pressure, temperature, and/or controlled hydrodynamic conditions for different aggressive environments that can be tested under conditions found in the industry. Therefore, various tests were developed as described below, also considering the operation of the autoclave, since the electrochemical cell, the reason for this invention, was designed to operate with this equipment.

Hydrostatic test. The hydrostatic test must be carried out whenever the graphite packing is changed between the lid and the body of the autoclave in order to guarantee the tightness of the autoclave and ensure that there will be no leakage between the graphite packing and the safety cover. The test consists of filling the container with approximately 3 liters of water, then closing the lid, and tightening the nuts to the torque recommended by the manufacturer (35 ft-lb), using a special torque wrench. The temperature is set at 100° C., the equipment is pressurized at 10 kg/cm$^2$ for 48 hours and the seal of the split flange is verified using soap and water, as it should not present any leaks in the form of bubbles.

Procedure for starting the autoclave. The recommended procedure for starting the autoclave is described below:
1. Make sure that the equipment is properly connected to the power source and the thermocouple in the thermowell inside the autoclave.
2. Turn on the control panel of the equipment, the potentiostat-galvanostat and the computer equipment.
3. Set the desired temperature in the set-point located on the control panel, using the temperature increase button, and then click on "set up".
4. Remove the seal located on the split flange. The flange is located on the head of the autoclave.
5. Remove the bolts on the split flange.
6. Remove the split flanges.
7. Remove the thermocouple housed in the thermowell.
8. Remove the body from the autoclave (head) and place it on the special support.
9. Remove the sample holder, housed in the heating container, from the autoclave.
10. Install the two X52 steel pseudo-electrodes in each of the corresponding electrode holders (O-ring of a polymer resistant to high temperatures).
11. Cut 0.3 cm×5 cm of a special sealer-insulator.
12. Place the special insulating sealant on the edge of the ring-type sealant to prevent any leakage of the solution between the interface of the electrode holder and the working electrode.
13. Place 900 ml of solution (NaCl 3.5%) in the Teflon container (sample holder).
14. Insert the sample holder with the solution into the heating container of the autoclave.
15. Attach the head to the body of the autoclave.
16. Install the security seal of the split flange.
17. Drive each split flange bolt to manufacturer-recommended torque (35 ft-lbs), using a special torque wrench. Note. Screws must be sealed in a crisscross pattern.
18. Place the thermocouple in the thermowell.
19. For safety, all seals on the autoclave should be inspected.
20. Connect the electrode cables to the corresponding terminals on the voltage switch.
    Note. The capacitor type electrical arrangement was considered:
    a. The terminal of the working electrode of the potentiostat-galvanostat is connected to a pseudo-electrode made of X52 steel.
    b. The terminals of the reference and auxiliary electrodes of the potentiostat-galvanostat are connected to the working electrode.

Start of validation using the electrochemical impedance spectroscopy technique.

Electrochemical evaluation is carried out using a potentiostat-galvanostat.

The recommended methodology for obtaining electrochemical impedance spectra is described below:
1. Proceed to open the software for electrochemical tests.
2. Select AC impedance.
3. Edit the parameters established for the electrochemical test: 10 kHz to 1 Hz, 10 mV disturbance and 42 points.
4. Edit the working electrode area.
5. Edit the type of material to use (mild steel).
6. Create a folder for experimental data to be stored, saving the name of the experiment.
7. Once the temperature to be studied is reached, run the program recommended by the manufacturer.

The recommended procedure for removal of pseudo-electrodes and sample:
1. Using the temperature decrease buttons, lower it to 15 temperature units, and then click on "set up".
2. Turn off the autoclave control panel.
3. Turn off auxiliary equipment: potentiostat-galvanostat and computer.
4. Disconnect and remove the cables of the voltage switch-galvanostat from the electrical connection of the working electrodes (Ni wire).
5. Remove the thermocouple located in the thermowell.
6. Remove the clamp lock located on the split flange.
7. Use a torque wrench to remove the flange bolts by turning it counterclockwise.
8. Remove the split flanges.
9. Remove the head from the body of the autoclave and place it on the special support.
10. Remove the electrode holders with the working electrodes from the autoclave head.
11. Remove the working electrodes from the electrode holder.
12. Remove the sample holder with the solution from the heating vessel.
13. Deposit the solution in a special waste container.
14. Wash and dry the sample holder.
15. Place the sample holder in the heating container.
16. Place the head on the body of the autoclave.
17. Place the thermocouple in the thermowell.
20. Place the seal located on the split flange.
21. Fit the bolts of the split flange.

Validation using the gravimetric method. The recommended procedure for determining corrosion rates by weight loss of coupons:
1. Grind the coupons with a mechanical finishing with 600-grit silicon carbide sandpaper to obtain a homogeneous and always clean surface.
2. Clean the electrodes with deionized water and a special brush.
3. Dry the electrodes.
4. Get the initial weight of the coupons.

Methodology for the determination of weight loss of coupons after electrochemical tests:
1. Obtain the weight of the electrodes with oxides.
2. Place the electrodes in a plastic container with inhibited hydrochloric acid (chemical cleaning) for 10 seconds.
3. Clean the electrodes with de-ionized water and a special brush.
4. Dry the electrodes.
5. Weigh the coupons again after chemical cleaning (final weight).

Taking into account the difference in coupon weights (initial weight-final weight), it is possible to determine the corrosion rates' values. The NACE TM0169/G31-12a standard recommends using the following equation (1) to determine the corrosion rate in millimeters/year (mm/year):

$$VC\left(\frac{mm}{año}\right) = \frac{(P_i - P_f) * 365{,}000}{A * \rho * T} \quad (1)$$

where $P_i$ is the initial weight of the working electrode (g) and Pf is the final weight (g); A denotes the total surface area of the specimen in contact with the fluid in (mm²); ρ is the density of the material (g/cm³); and T is the duration of the test in days.

Electrochemical characterization and validation of results.

The electrochemical characterization of an API X52 pipeline steel, exposed to a known corrosive environment, was carried out to validate the adaptation of the rotating cylinder electrochemical cell in hermetic equipment for internal corrosion studies that simulate hydrodynamic conditions and operating temperature in pipelines transporting hydrocarbons. Example 1 illustrates the electrochemical impedance spectroscopy responses of X52 steel exposed to a 3.5% aqueous NaCl solution at a temperature of 80° C. without rotating the rotating cylinder electrode (X52 steel). Example 2 shows the electrical circuit used to carry out the best adjustment of the experimental data, while the parameters of the electrical elements involved in the adjustment are shown in Table 3.

Figure 6A:
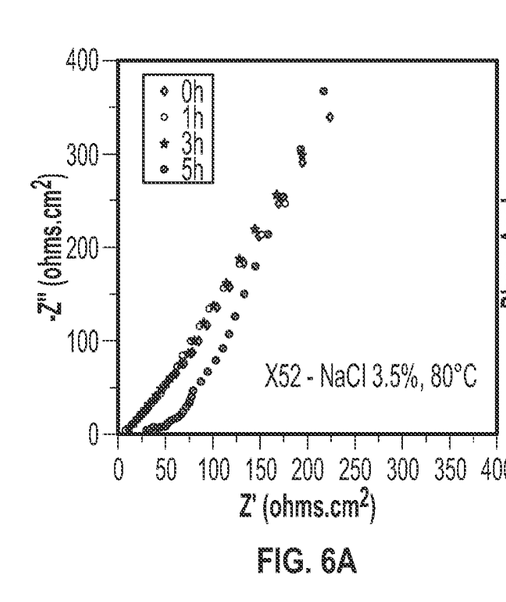
FIG. 6 shows two typical diagrams obtained by the application of the rotating cylinder electrochemical cell, the object of the present invention: (a) Nyquist diagram, showing the real impedance, Z', in ohms-$cm^2$ and the imaginary impedance, -Z", in ohms-$cm^2$; and (b) Bode diagram of the phase angle, showing the spectra of the log of frequency in Hz (Log f, Hz) versus—the phase angle in degrees (°).
Figure 6B:
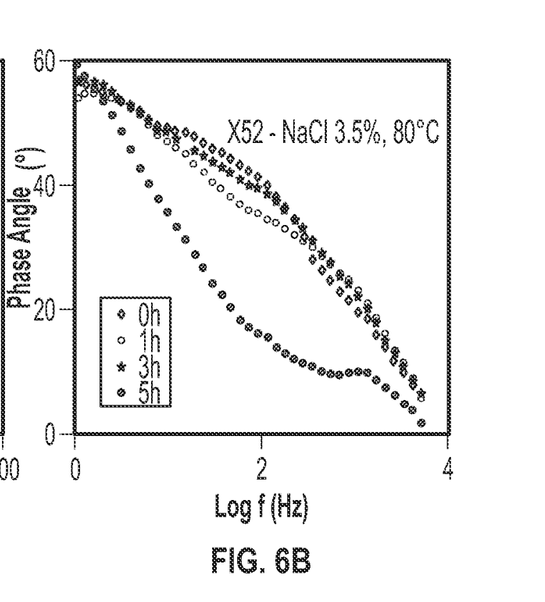

Examples The following examples related to the rotating cylinder electrochemical cell, the object of the present invention and described above, are presented, without limiting its technical scope:

Example 1. Nyquist diagram representing the real impedance spectra, Z' in ohms·cm² and imaginary impedance spectra, –Z" in ohms·cm²; and Bode diagram of the phase angle representing the spectra of the log of frequency in Hz (Log f, Hz) versus the phase angle in degrees (°), are shown in FIGS. 6 (a) and (b).

Figure 7:
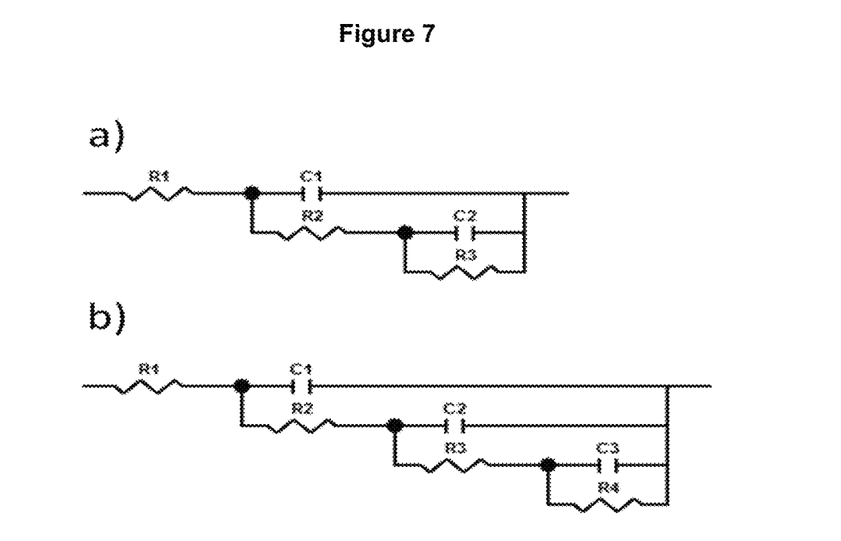
FIG. 7 shows: (a) An electric circuit with a series-parallel arrangement described by R1[(R2C1)(R3C2)], where R1 is the resistance associated with the conductivity of the solution electrolyte, C1 is the capacitance ascribed to corrosion products; R2 is the resistance of corrosion products, C2 is the capacitance associated with the double electric layer, and R3 is the resistance related to the charge transfer. (b) An electric circuit with a series-parallel arrangement described by R1 [(R2C1)(R3C2)(R4C3)], where R4 and C3 is the capacitance and resistance of the diffusion process that occurred through the interface of metal/corrosion products/electrolyte.

Example 2. Electric circuit with a series-parallel arrangement of R1 [(R2C1) (R3C2)], where R1 is the resistance associated with the conductivity of the solution, C1 is the capacitance associated with corrosion products, R2 is the resistance associated with corrosion products, C2 is the capacitance associated with the electrical double layer and R3 is the resistance associated with charge transfer; and electrical circuit with a series-parallel arrangement of R1 [(R2C1) (R3C2) (R4C3)], where R4 and C3 are the capacitance and resistance of the diffusion processes that occur through the metal/corrosion products/electrolyte interface, are shown in FIGS. 7 (a) and (b).

Example 3 illustrates the electrochemical impedance spectroscopy responses of X52 steel exposed to 3.5% NaCl at 90° C., after 5 hours of electrode exposure and three rotational speeds. The parameters of the electrical elements involved in the adjustment are shown in Table 4.

Figure 8:
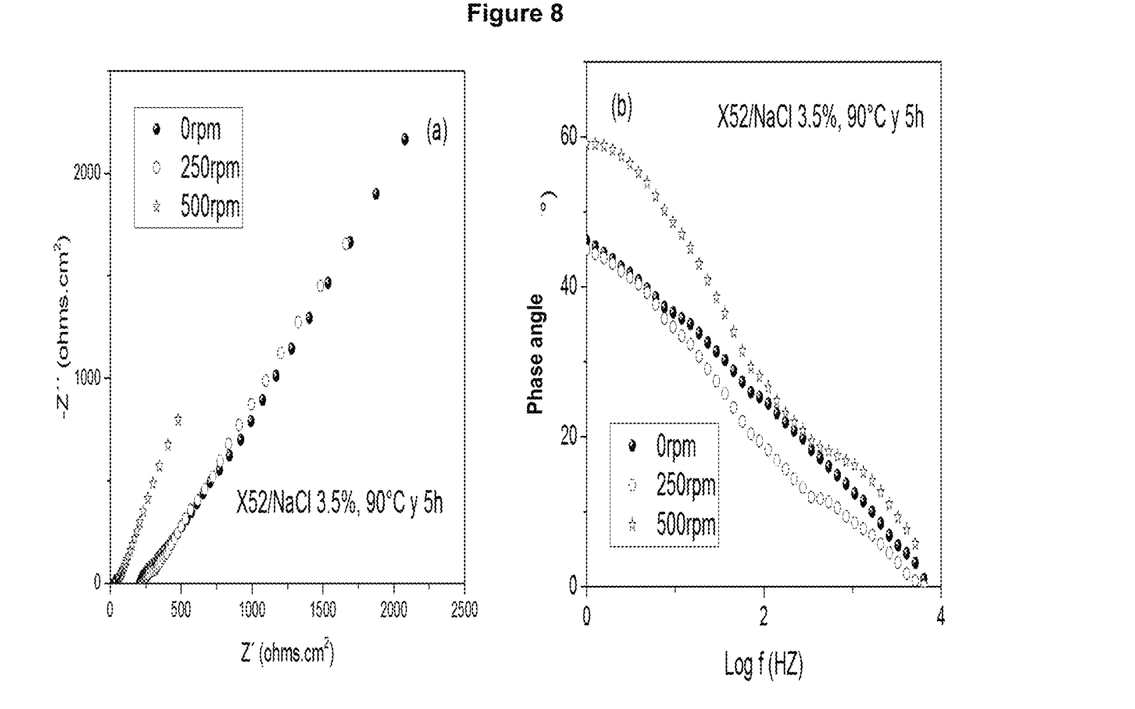
FIG. 8 refers to: (a) Nyquist diagram and (b) Bode diagram of the phase angle.

Example 3. Nyquist diagram and Bode diagram of the phase angle at different rotational speeds are shown in FIGS. 8 (a) and (b).

Figure 9:
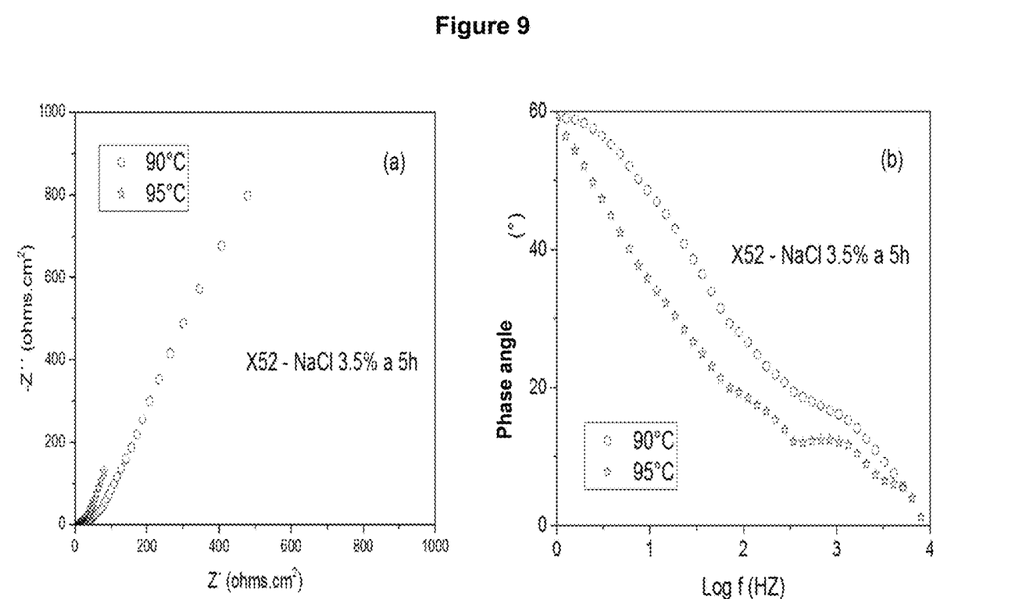
FIG. 9 exhibits: (a) Nyquist diagram and (b) Bode diagram of the phase angle.

Example 4. Example 4 shows the electrochemical impedance spectroscopy responses of X52 steel exposed to a 3.5% aqueous NaCl solution at 500 rpm, 5 hours of electrode exposure, and two temperatures, shown in FIGS. 9 (a) and (b). The parameters of the electrical elements involved in the adjustment are shown in Table 5.

Example 5. Corrosion rates obtained for two X52 steel electrodes (coupons) exposed to 3.5% NaCl at 500 rpm and different temperatures, is shown in Table 6.

Figure 10:
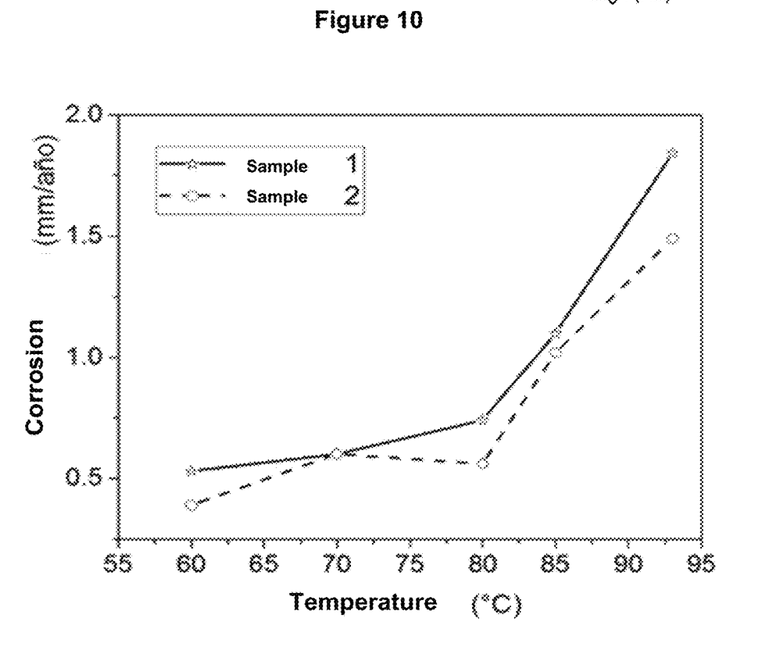
FIG. 10 presents the profiles of corrosion rates as a function of temperature obtained for two samples of X52 steel immersed in an aqueous solution of 3.5% wt. % NaCl at 500 rpm for 5 hours.

Example 6. Corrosion rate profiles as a function of temperature obtained for two X52 steel coupons exposed to a 3.5% aqueous solution of NaCl at 500 rpm and 5 hours of electrode exposure are shown in FIG. 10.

The results shown in Tables 1 and 2 were calculated with the data shown in equation (2) for shear stress [15]. The speed in rpm is supplied by the rotary cylinder control unit, and this number is set on the screen. The calculation of the shear stress is carried out by means of the following formula:

$$\tau_\omega = 0.0791 \, Re^{-0.3} \rho r_{cyl}^2 \omega^2 \qquad (2)$$

where: ρ=density of a sour brine (1025 kg/m³); $r_{cyl}$=radius of the cylinder (0.001 m); ω=angular velocity (Rad/s); $R_e$=Reynolds number=2 $r_{cyl}^2$ ω/ν; ν=kinematic viscosity of the fluid (1,046 m²/s).

Tables 3, 4, and 5 show the results of the electrical parameters obtained from the fit between the experimental data measured by the electrochemical impedance technique and the equivalent electrical circuit model (CEE) shown in FIG. 7. The CEE parameters were calculated by means of commercial software [16].

[15] N. Balderas, Study of the effect of the turbulent flow of carbon steel by a rotating cylinder electrode, MSc thesis, UNAM 2009

[16] ZsimpWin version 3.22 of Princenton Applied Research.

Table 6 shows the uniform corrosion rate, generated on carbon steel metallic electrodes at different temperatures using the gravimetric weight loss technique. NACE TM0169/G31-12ᵃ standard [17] recommends using the following equation (1) to determine the corrosion rate in millimeters/year (mm/year), previously defined on page 18.

TABLE 1

Relationship between rotational speed and shear stress for the rotating cylinder electrode (RCE).

| Rate (rpm) | τ (N/m²) |
|---|---|
| 0 | 0 |
| 1000 | 21.6 |
| 2000 | 70.19 |
| 3000 | 139.85 |
| 5000 | 333.28 |

TABLE 2

Relationship between rotary cylinder electrode radius and shear stress.

| Ratio (m) | τ (N/m²) |
|---|---|
| 0 | 0 |
| 0.003 | 5.43 |
| 0.006 | 21.74 |
| 0.012 | 86.97 |
| 0.024 | 347.8 |
| 0.072 | 3131.02 |

[17] ASTM NACE TM0169/G31-12a (2012) Standard Guide for Laboratory Immersion Corrosion Testing of Metals. Philadelphia ASTM International.

TABLE 3

Electrical parameters obtained from the best fit to the experimental data of the rotating cylinder electrode: X52 steel exposed to a 3.5% aqueous solution of NaCl at 80° C. at 0 rpm and different electrode exposure times.

| Time (h) | $R_1$ ($\Omega \cdot cm^2$) | $R_2$ ($\Omega \cdot cm^2$) | $C_1 \times 10^{-4}$ (F) | $R_3$ ($\Omega \cdot cm^2$) | $C_2 \times 10^{-4}$ (F) | $R_4$ ($\Omega \cdot cm^2$) | $C_3 \times 10^{-4}$ (F) |
|---|---|---|---|---|---|---|---|
| 0 | 6 | 55 | 11.91 | 736 | 8.68 | — | — |
| 1 | 5 | 25 | 6.23 | 935 | 9.88 | — | — |
| 3 | 5 | 46 | 7.414 | 1250 | 9.86 | — | — |
| 5 | 29 | 30 | 2.28 | 71 | 3.20 | 1552 | 6.34 |

TABLE 4

Electrical parameters obtained from the best fit to the experimental data of the rotating cylinder electrode: X52 steel exposed to a 3.5% aqueous solution of NaCl at 90° C., after 5 hours of electrode exposure and three rotation speeds.

| rpm | $R_1$ ($\Omega \cdot cm^2$) | $R_2$ ($\Omega \cdot cm^2$) | $C_1 \times 10^{-4}$ (F) | $R_3$ ($\Omega \cdot cm^2$) | $C_2 \times 10^{-4}$ (F) |
|---|---|---|---|---|---|
| 0 | 206 | 251 | 0.133 | 9340 | 1.02 |
| 250 | 218 | 139 | 2.45 | 7800 | 1.57 |
| 500 | 21 | 66 | 2.58 | 2700 | 2.80 |

TABLE 5

Electrical parameters obtained from the best fit to the experimental data of the rotating cylinder electrode: X52 steel exposed to a 3.5% aqueous solution of NaCl at 500 rpm, 5 hours of electrode exposure, and two temperatures (90° C. and 95° C.).

| Temperature (° C.) | $R_1$ ($\Omega \cdot cm^2$) | $R_2$ ($\Omega \cdot cm^2$) | $C_1 \times 10^{-4}$ (F) | $R_3$ ($\Omega \cdot cm^2$) | $C_2 \times 10^{-4}$ (F) |
|---|---|---|---|---|---|
| 90 | 21 | 66 | 2.58 | 5700 | 2.80 |
| 95 | 9 | 12 | 3.148 | 530 | 18.37 |

TABLE 6

Corrosion rates obtained for two X52 steel electrodes (coupons) exposed to 3.5% NaCl at 500 rpm and different temperatures.

| Temperature (° C.) | Corrosion rate (mm/year) Electrode 1 | Corrosion rate (mm/year) Electrode 2 |
|---|---|---|
| 60 | 0.53 | 0.39 |
| 70 | 0.60 | 0.60 |
| 80 | 0.74 | 0.56 |
| 85 | 1.10 | 1.02 |
| 93 | 1.84 | 1.49 |

The invention claimed is:

1. A rotating cylinder electrochemical cell for a hydrodynamic system operating at high pressure and high temperature comprising:
an electrochemical cell enclosure that includes a bottom and a top, wherein the top is removably mountable to the bottom;
a rotating cylinder mounted on the top and configured to receive a rotating working electrode;
a first electrode port on the top that is configured to receive a reference electrode;
a second electrode port on the top that is configured to receive an auxiliary electrode; and
at least one cylindrical container, wherein the at least one cylindrical container is configured to be mounted in the electrochemical cell enclosure, and wherein the electrochemical cell enclosure is configured to receive cylindrical containers having different interior diameters that generate different hydrodynamic flow conditions.

2. The rotating cylinder electrochemical cell, according to claim 1, further comprising means for sealing the top to the bottom such that an interior of the electrochemical cell enclosure can be operated at up to 5000 psi (352 kg/cm²) at a maximum operating temperature of 350° C.

3. The rotating cylinder electrochemical cell, according to claim 1, further comprising a removable multifunctional system configured to be coupled to a rotating working electrode mounted in the electrochemical cell enclosure and to an auxiliary electrode mounted in the second electrode port, wherein the multifunctional system is configured to perform electrochemical evaluations of materials in corrosive media.

4. The rotating cylinder electrochemical cell, according to claim 1, wherein the first electrode port is configured to form a hermetic seal with a reference electrode such that an interior of the electrochemical cell enclosure can be held at above ambient pressure during testing procedures.

5. The rotating cylinder electrochemical cell, according to claim 1, further comprising:
a motor mounted to the electrochemical cell enclosure;
a rod mounted to the rotating cylinder; and
a coupling that connects a rotating shaft of the motor to the rod.

6. The rotating cylinder electrochemical cell of claim 5, wherein a first end of the rod is coupled to the rotating shaft of the motor by the coupling and wherein a second end of the rod extends into an interior of the electrochemical cell enclosure and is configured to be coupled to a rotating working electrode.

7. The rotating cylinder electrochemical cell of claim 6, further comprising at least one electrical brush that is configured to contact the rod, wherein the at least one electrical brush is configured to be electrically coupled to a rotating working electrode mounted to the second end of the rod.

8. The rotating cylinder electrochemical cell of claim 1, wherein the second electrode port comprises a plurality of auxiliary electrodes arranged symmetrically around a rotating working electrode in the interior of the electrochemical cell enclosure.

9. A rotating cylinder electrochemical cell, comprising:
an electrochemical cell enclosure that includes a bottom and a top, wherein the top is removably mountable to the bottom;
a rotating cylinder mounted on the top and configured to receive a rotating working electrode;
a plurality of auxiliary electrodes arranged symmetrically around a rotating working electrode in an interior of the electrochemical cell enclosure.

10. The rotating electrochemical cell of claim 9, further comprising:
a motor mounted to the electrochemical cell enclosure;
a rod mounted to the rotating cylinder; and
a coupling that connects a rotating shaft of the motor to a first end of the rod, wherein a second end of the rod extends into the interior of the electrochemical cell enclosure and is configured to be coupled to a rotating working electrode.

11. The rotating cylinder electrochemical cell of claim 10, further comprising at least one electrical brush that is configured to contact the rod, wherein the at least one electrical brush is configured to be electrically coupled to a rotating working electrode mounted to the second end of the rod.

12. The rotating cylinder electrochemical cell of claim 9, wherein the electrochemical cell enclosure is configured to receive cylindrical containers having different interior diameters that generate different hydrodynamic flow conditions.

13. The rotating cylinder electrochemical cell of claim 9, further comprising at least one bearing in the top to which the rotating cylinder is mounted.

14. The rotating cylinder electrochemical cell of claim 8, wherein the auxiliary electrodes are each coupled to an electrode holder.

15. The rotating cylinder electrochemical cell of claim 9, wherein the auxiliary electrodes are each coupled to an electrode holder.

* * * * *